Figure 1:
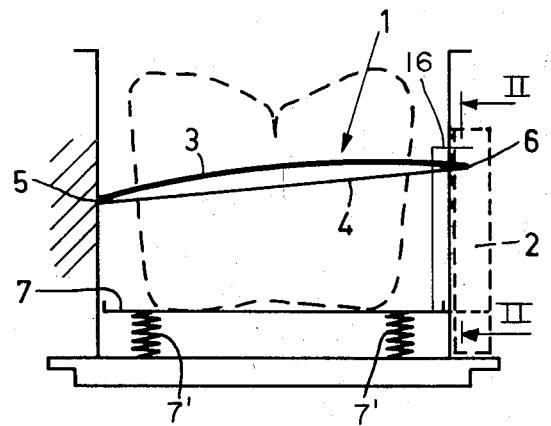

United States Patent [19]

Siemensma

[11] 3,828,559
[45] Aug. 13, 1974

[54] TEMPERATURE RESPONSIVE CONTROL DEVICE

[75] Inventor: Sidonius Volkert Siemensma, Groningen, Netherlands

[73] Assignee: U.S. Philips Corporation, New York, N.Y.

[22] Filed: Nov. 4, 1971

[21] Appl. No.: 195,747

[30] Foreign Application Priority Data
Nov. 4, 1970 Netherlands...................... 7016113

[52] U.S. Cl....................... 60/529, 99/326, 337/354
[51] Int. Cl....................... F03g 7/06, A47j 27/62
[58] Field of Search............ 73/343 R, 363.5, 363.1; 99/326, 329 R, 342; 337/354; 219/458, 452; 60/529

[56] References Cited
UNITED STATES PATENTS

| | | | |
|---|---|---|---|
| 1,250,862 | 12/1917 | Hall | 73/363.5 X |
| 1,819,108 | 8/1931 | Michelsen | 73/363.5 X |
| 2,325,551 | 7/1943 | Scharf | 99/329 R |
| 2,547,610 | 4/1951 | Wentworth | 73/363.1 X |
| 2,565,425 | 8/1951 | Hamill | 73/363.1 X |
| 2,580,554 | 1/1952 | Kitto | 99/329 R |
| 2,597,805 | 5/1952 | Kitto | 99/329 R |
| 2,690,050 | 9/1954 | Nichols | 60/529 |
| 2,706,523 | 4/1955 | Olson et al. | 73/363.5 X |
| 3,015,235 | 1/1962 | Siri | 73/363.1 |

FOREIGN PATENTS OR APPLICATIONS
1,373,745   1964   France .................. 99/326

Primary Examiner—Richard C. Queisser
Assistant Examiner—Daniel M. Yasich
Attorney, Agent, or Firm—Frank R. Trifari

[57] ABSTRACT

A temperature responsive control device used in toasters and the like, has a thermosensitive element comprising a rod of a material having a very low coefficient of thermal expansion and a thin strip made of a material having a high coefficient of thermal expansion. The thin strip is held in a stressed condition between the ends of the resiliently curved rod. The element may be clamped at one end, the movement of the other end being used for switching purposes. Because of the small heat capacity of the thin strip the element will rapidly respond to changes in the ambient temperature.

6 Claims, 4 Drawing Figures

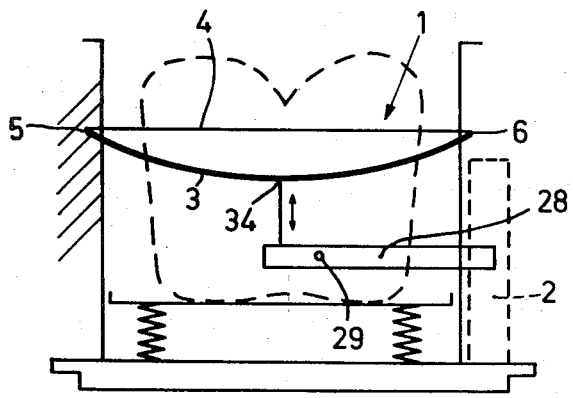
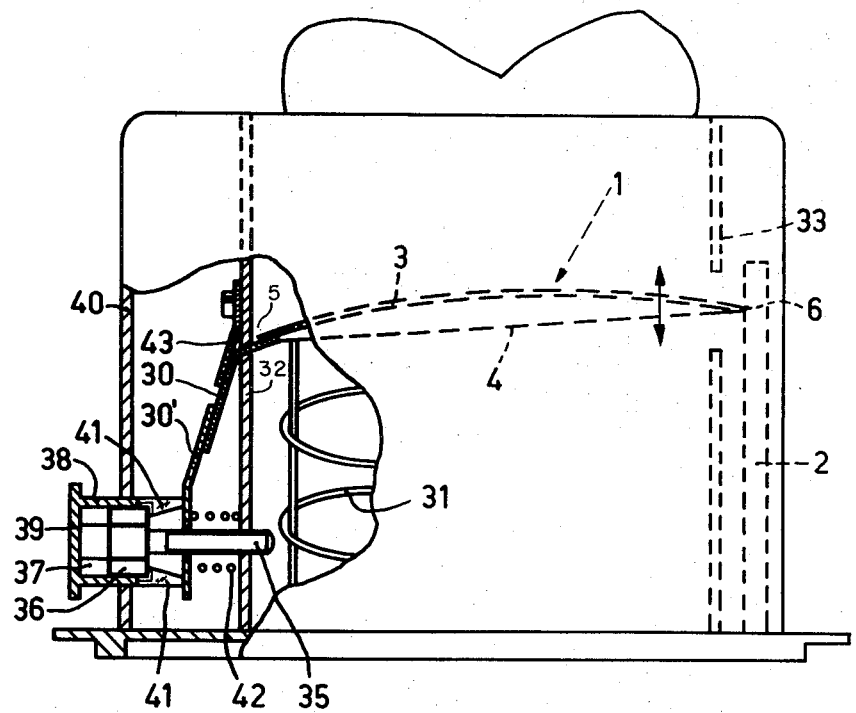

TEMPERATURE RESPONSIVE CONTROL DEVICE

The invention relates to a thermosensitive element comprising co-operating parts made of materials having different coefficients of thermal expansion, which element is deformed by a change in temperature, which deformation may be used for various purposes, for example for operating switches.

Such thermosensitive elements may be used, for example, for controlling the temperature in a room heated by a central heating system or for controlling the temperature of an electric iron. In addition, these elements may be used for protecting electric motors against overheating or as timing switches in combination with heaters having a constant thermal output per unit of time. French Pat. specification No. 1,373,745 describes a toaster having such a timing switch provided with a bimetal element which is used not only to switch off the heating element after a predetermined time but which also disconnects a mechanical locking device, whereupon a movable carriage will eject the toasted slices from the toaster by means of spring force.

A temperature-sensitive element as described in the said French Patent Specification mainly comprises a strip composed of two layers of different materials having different coefficients of expansion. Such elements have a comparatively large heat capacity, which is one of the reasons why the temperature of the element lags the ambient temperature. If such a thermosensitive element is used to maintain constant the ambient temperature or the temperature of an object, the temperature will actually fluctuate about this constant value, the fluctuations increasing with the rate of lagging of the temperature of the element.

The slow rate of cooling of the element owing to its large heat capacity may be an additional advantage in some cases. For example, the toaster described in the said French Patent Specification has a complicated locking mechanism for the bread carriage, which releases the carriage only after the thermosensitive element has passed through a heating and cooling cycle. Without these special provisions one would have to wait after each toasting period until the thermosensitive element had cooled before the toaster could be used again.

The thermosensitive element according to the invention, which has the object of avoiding or at least largely eliminating the aforementioned disadvantages, is characterized in that the thermosensitive element includes a thin elongate part made of a material having a high coefficient of thermal expansion, which thin elongate part is held in a stressed condition between the ends of a resiliently curved rod-shaped member made of a material having a coefficient of thermal expansion which is very low by comparison.

The resiliently curved rod-shaped member maintains the thin elongate element in a condition of tensile stress. The element may be in the form of a wire or ribbon having a very small thickness and hence a very small heat capacity. Changes in the ambient conditions will rapidly influence the temperature of this element and the resulting changes in length will cause corresponding changes in the curvature of the curved rod-shaped member.

Figure 2:
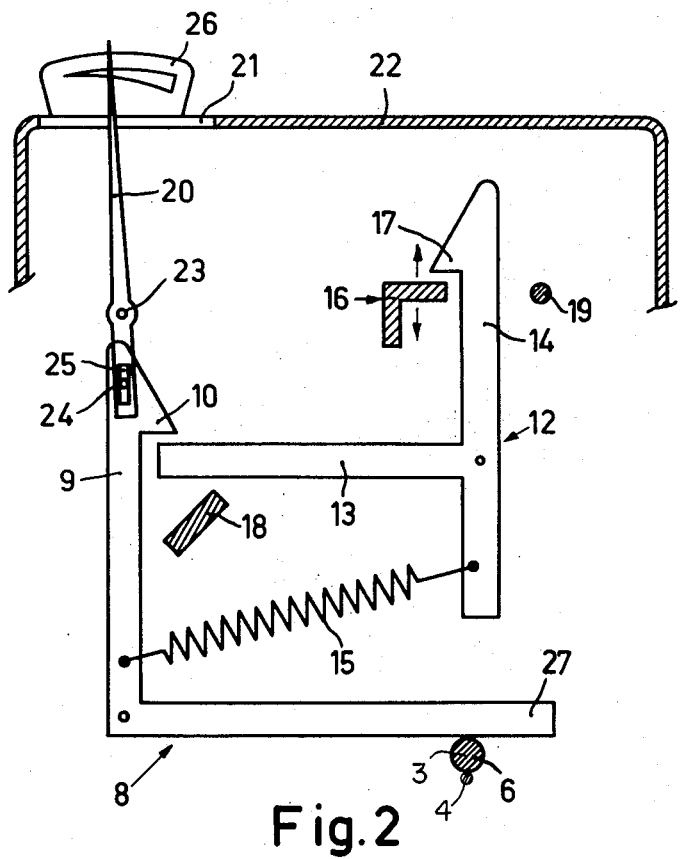

Embodiments of the invention will now be described, by way of example, with reference to the accompanying diagrammatic drawings, in which:

FIG. 1 shows schematically a thermosensitive element according to the invention used in a toaster, FIG. 2 shows likewise schematically in cross-section along lines II—II of FIG. 1 a simple locking device which may be operated by the thermosensitive element of FIG. 1, FIG. 3 shows schematically a modification of the embodiment shown in FIG. 1, and FIG. 4 is a part elevation, part sectional view of a toaster provided with a thermosensitive element and with a setting and operating mechanism.

FIG. 1 shows schematically a toaster in which a thermosensitive element 1 extends parallel to a slice of bread placed in the toaster. The thermosensitive element 1 is a resiliently curved rod 3, whose ends are connected between the ends of a thin strip 4 held in a stressed condition.

The material of the rod 3 may be a nickel-iron alloy, for example, that known under the trade name invar, which has a very low coefficient of thermal expansion. The thin strip of wire 4 may be made of a material having a large coefficient of expansion, such as brass or a chrome-nickel alloy.

A control function for the toaster appliance is performed as follows. One end 5 of the rod is rigidly secured to the frame of the toaster. The other end 6 is freely movable. During the toasting operation the thermal output of heating elements, not shown, will cause the strip 4 to increase in length, enabling the rod 3 to relax. As a result the end 6 will move upward. The movement of the end 6 is used to operate a locking device 2, for example of the type shown in FIG. 2. By means of this locking device position of the carriage 7 on which the slice rests is controlled, being held in the lowermost position shown when locked. When at a given instant the end 6 has risen far enough, the locking device is disconnected so that the carriage is thrust upwards by the action of springs 7'. Simultaneously the heating element is switched off by means not shown and the toasted slice may be taken from the toaster. The heat capacity of the strip 4 is so small that immediately after the heating element has been switched off the strip 4 decreases in length and the end 6 moves downward in a clearly perceptible manner. In addition, a new slice of bread which immediately after a toasting cycle is placed in the toaster has a marked cooling effect on the closely adjacent thermosensitive element. The cooling of the thermosensitive element 1 is effected at so rapid a rate that the toaster may be used continuously and between two toasting cycles no intervals for allowing the element to cool are required.

Thus, the locking device may be very simple, for example as shown in FIG. 2. The end 6 of the thermosensitive element in its upward movement presses against a horizontal arm 27 of a bell crank 8. As a result, the horizontal arm 13 of a second bell crank 12 is disengaged from a hooked end 10 of a vertical arm 9 of the bell crank 8. The forces which a drawspring 15 and an arm 16 connected to the carriage 7 exert on the bell crank 12 cause it to pivot, so that the arm 16 is disengaged from a hooked end 17 of a vertical arm 14. Thereupon the carriage is thrust upwards by spring force. After at least one slice to be toasted has been placed on the carriage, this is manually depressed, whereupon at a given instant the arm 16 of the carriage strikes the horizontal arm 13, with the result that the bell crank 12 is pivoted until the horizontal arm 13 engages behind the hooked end 10 of the bell crank 8 which in the meantime owing to the cooling of the thermosensitive element 1 has returned to the position shown. If now the carriage is released, the arm 16 in turn will engage behind the hooked end 17 of the bell crank 12, so that the carriage is held in the lowermost position shown in FIG. 1. The movements of the bell cranks 8 and 12 are limited by stops 18 and 19.

The arm 16 of the carriage is so coupled to a switch that when the carriage moves upwards the heating element is switched off and when it moves downwards the heating element is switched on.

Owing to the large deflection of the thermosensitive element 1 and because this deflection continuously takes place in the same direction as long as the heat element is switched on, an indicator showing the rate of progress of the toasting process may simply be mounted. In the embodiment shown in FIG. 2 the bell crank 8 is coupled to a pointer 20 one end of which projects from an opening 21 in the wall 22 of the toaster. The pointer is capable of pivoting about a point 23. The coupling to the bell crank 8 may, for example, be established by means of a pin 24 which is secured to the end of the vertical arm 9 and extends in a slot 25 formed in the pointer close to the pivot point 23. Thus the pointer, which moves over a scale graduation 26, indicates the movement of the thermosensitive element in a magnified manner and consequently gives an indication of the rate of progress of the toasting process.

The embodiment shown in FIG. 3 is fundamentally equal to that shown in FIG. 1, with the difference that here the deflection of the centre 34 of the arcuate member 3 is used to operate a locking device 2. The movement of the point 34 is transmitted by means of a lever 28 arranged to pivot about a point 29. The thermosensitive element 1 is again fixed at the end 5, but in this embodiment the end 6 is supported so as to prevent movement in a vertical direction.

FIG. 4 shows a simple method of fixing the end 5. The element extends in the toasting space bounded by heating elements 31 and walls 32 and 33. The ends 5 and 6 of the element extend through openings in the walls 32 and 33 to the exterior of the toasting space. The end 5 has a rigid downwardly directed arm 30 through which a bolt 35 passes which can be externally operated. A threaded end of the bolt 35 is screwed in the wall 32.

The other end 36 of the bolt 35 has a hexagonal or some other unround section. This end 36 is disposed in a cavity 37 in a cylindrical part 38 of a knob 39. The cavity 37 has a section corresponding to that of the end 36, so that the knob is axially movable with respect to the bolt 35, but the bolt 35 and the knob 39 cannot turn with respect to one another. The knob 39 is rotatably mounted in an outer wall 40 of the toaster. One end of the cylindrical part 39 of the knob is provided with resilient hooked parts 41 which are separated from one another by incisions and engage behind the part 36 of the bolt 35. The rigid arm 30 is pressed against the hooked part 41 by a spring 42. The position of the rigid arm 30 and hence that of the thermosensitive element can be changed by turning the knob 39. Thus the shade of the toast is continuously and accurately selectable. By pushing the knob 39 in (axially with respect to bolt 35) without rotating the bolt 35 the rigid arm may be moved against the action of the compression spring 42, raising the end 6 of the thermosensitive element 1 and hence permitting the toasting process to be terminated at any desired instant. To enable the thermosensitive element to be adjusted, for example during manufacture, the knob 39 may be removed and the bolt 35 may be separately rotated.

The deflection of the end 6 which is produced in the arrangement of the thermosensitive element shown in FIGS. 1 and 4, with the end 5 fixed, still is considerably greater than the deflection of the center 34 of the arcuate member 3 in the arrangement shown in FIG. 3, other conditions remaining the same. Hence, additional levers for transmitting or magnifying the deflection may generally be dispensed with in the arrangement of the thermosensitive element shown in FIGS. 1 and 4.

A leaf spring 43 secured to the wall 32 exerts pressure on the end 5 (FIG. 4). This leaf spring 43 holds the end 5 in place, but does not prevent pivotal movement of the thermosensitive element about the end 5 when the bolt 35 is turned or the knob 39 is operated.

The rigid arm 30 may entirely or partly be constructed as a bimetal element, enabling an additional automatic setting of the thermosensitive element to be obtained. This may be used, for example, when the first slices of bread toasted by the toaster during the warming-up stage of the appliance should have an another shade than is obtained with the same position of the adjusting knob 39 when the appliance has been used for some time and the entire appliance has reached a substantially constant operating temperature.

In FIG. 4 the bimetal part of the rigid arm 30 is designated 30'. If the first slices of bread to be toasted by the toaster are being toasted too long and consequently have too dark a shade owing to the fact that the thermosensitive element still partly responds to the initially low temperature of the appliance, the bimetal element will be designed so that when the temperature of the appliance rises the curvature of the bimetal element due to its response to this raised temperature will so pivot the thermosensitive element 1 that the end 6 is moved away from the switching mechanism. This provides automatic compensation for temperature differences in the appliance which may influence the cycle periods of the thermosensitive element.

What is claimed is:

1. A temperature responsive control device for use in a domestic appliance comprising a thermosensitive element carried within said appliance and arranged for mechanical deformation by temperature changes, said element comprising an assembly of a thin elongated part made of a material having a relatively high coefficient of thermal expansion, and a resiliently curved rod-shaped body made of a material having a coefficient of thermal expansion which is low relative to the coefficient of thermal expansion of said thin elongated part, said thin elongated part having ends being connected between the ends of said curved rod-shaped body in a substantially straight stressed condition, said thin straight elongated part and said resiliently curved rod shaped body thus forming a substantially bow shaped assembly, said thermosensitive element being supported within said appliance with one of the ends of said thermosensitive element being rigidly secured to the frame of said appliance, the other end thereof being freely movable in a direction substantially transverse to the longitudinal axis of said thin elongate part, and responsive means for cooperating with said freely movable end for performing a preselected control function upon movement of said free end as a result of deformation of said element in response to temperature change.

2. The temperature responsive control device according to claim 1 further comprising a rigid arm connected to one end of said element, and adjusting means cooperating with said arm for adjusting the responsiveness of said element.

3. The temperature responsive control device according to claim 2 wherein said arm is at least partly constructed as a bimetallic element.

4. The temperature responsive control device according to claim 3 wherein said adjusting means comprises a rotatably adjustable screw bolt connecting said rigid arm of the thermosensitive element to the frame of the appliance.

5. The temperature responsive control device according to claim 4 further comprising a knob carried on an end of said bolt so that as said knob is turned said bolt will be axially advanced so as to engage said rigid arm.

6. A thermosensitive element responsive to temperature changes by mechanical deformation, comprising a thin elongated part made of a material having a relatively high coefficient of thermal expansion, and a resiliently curved rod-shaped body made of a material having a coefficient of thermal expansion which is low relative to the coefficient of thermal expansion of said thin elongated part, said thin elongated part having ends being connected between the ends of said curved rod-shaped body in a stressed condition so as to form a bow shaped assembly, one of said connected ends fixed while the other of said connected ends being movable relative thereto, said movable connected ends movable in response to temperature changes, and responsive means in an appliance cooperating with said thermosensitive element at a free end thereof for performing a preselected control function upon deformation of said element in response to said temperature changes so as to cause movement of said free end in a direction substantially transverse to the longitudinal axis of said thin elongated part.

* * * * *